US012084891B2

(12) United States Patent
Liao

(10) Patent No.: US 12,084,891 B2
(45) Date of Patent: Sep. 10, 2024

(54) CONTROL DEVICE FOR A PUSH BAR LATCH

(71) Applicant: Yi Fan Liao, Taoyuan (TW)

(72) Inventor: Yi Fan Liao, Taoyuan (TW)

( * ) Notice: Subject to any disclaimer, the term of this patent is extended or adjusted under 35 U.S.C. 154(b) by 129 days.

(21) Appl. No.: 17/821,515

(22) Filed: Aug. 23, 2022

(65) Prior Publication Data

US 2023/0323701 A1 Oct. 12, 2023

(30) Foreign Application Priority Data

Apr. 7, 2022 (TW) ................................ 111203500

(51) Int. Cl.

| | |
|---|---|
| ***E05B 47/00*** | (2006.01) |
| ***E05B 1/00*** | (2006.01) |
| ***E05B 15/04*** | (2006.01) |

(52) U.S. Cl.

CPC ........ *E05B 47/0002* (2013.01); *E05B 1/0038* (2013.01); *E05B 15/04* (2013.01); *E05B 2047/0037* (2013.01)

(58) Field of Classification Search

CPC .... E05B 47/0002; E05B 1/0038; E05B 15/04; E05B 2047/0037

See application file for complete search history.

(56) References Cited

U.S. PATENT DOCUMENTS

| | | | | |
|---|---|---|---|---|
| 6,104,594 A * | 8/2000 | Frolov | E05B 65/1073 | 361/139 |
| 8,182,003 B2 * | 5/2012 | Dye | E05B 65/1053 | 292/216 |
| 8,978,305 B2 * | 3/2015 | Morstatt | E05B 65/1093 | 292/201 |
| 10,174,525 B2 * | 1/2019 | Arlinghaus | E05B 65/1053 | |
| 10,968,664 B2 * | 4/2021 | Arlinghaus | E05B 81/77 | |
| 2016/0333621 A1 * | 11/2016 | Lehner, Jr. | E05F 11/54 | |
| 2020/0248484 A1 * | 8/2020 | Arlinghaus | E05B 47/0012 | |

* cited by examiner

*Primary Examiner* — Mark A Williams

(74) *Attorney, Agent, or Firm* — Rosenberg, Klein & Lee

(57) ABSTRACT

A control device for a push bar latch, comprising: a base frame having a sliding slot; a control connecting rod, the outer end is combined with an unlocking return unit of the push bar latch and the inner end has a positioning pin, the positioning pin is set through the sliding slot; a locking hook, the outer end has a hook portion relative to the positioning pin; an electromagnet, used for holding the inner end section of the locking hook, so let the hook portion enter a hooking state for the positioning pin; and a release element, used to release the hook portion from the hooking state for the positioning pin when the electromagnet is powered off. Whereby the push bar latch has the enter control function.

4 Claims, 5 Drawing Sheets

CONTROL DEVICE FOR A PUSH BAR LATCH

BACKGROUND OF THE INVENTION

1. Field of the Invention

The invention relates to a control device for a push bar latch, especially the one who has an enter control function.

2. Description of the Related Art

As showing in FIG. 1, the push bar latch 10 can be unlocked by pushing the push rod 11 to go out, and the setting range of the push rod 11 is very large, so that the push bar latch 10 is very convenient for unlocking and is often used in exit doors; however, there are more and more demands for access control, as long as there are no security concerns, adding a control device to the push bar latch 10 can facilitate the entry and exit of people and has enter control function.

SUMMARY OF THE INVENTION

It is a primary objective of the present invention to provide a control device for a push bar latch, especially the one who has enter control function.

In order to achieve the above objectives, the present invention comprise: a base frame having a sliding slot; a control connecting rod, the outer end is combined with an unlocking return unit of the push bar latch and the inner end has a positioning pin, the positioning pin is set through the sliding slot; a locking hook, pivoted on the base frame, and the outer end has a hook portion relative to the positioning pin; an electromagnet, arranged on the base frame relative to the inner end section of the locking hook, and used for holding the inner end section of the locking hook, so let the hook portion enter a hooking state for the positioning pin; and a release element, arranged on the base frame relative to the locking hook, and used to release the hook portion from the hooking state for the positioning pin when the electromagnet is powered off.

Moreover, the release element is a push rod and a push spring, when the electromagnet is powered off, the push spring pushes out the push rod to push the locking hook to release the hook portion from the hooking state of the positioning pin; wherein the electromagnet is annular, and the push rod and the push spring are arranged in the electromagnet, the inner end of the push rod has a limit buckle, the limit buckle limits the distance that the push rod is pushed out by the push spring, and a reverse push spring is arranged between the locking hook and the base frame relative to the push spring.

DETAILED DESCRIPTION OF THE PREFERRED EMBODIMENT

Figure 1:
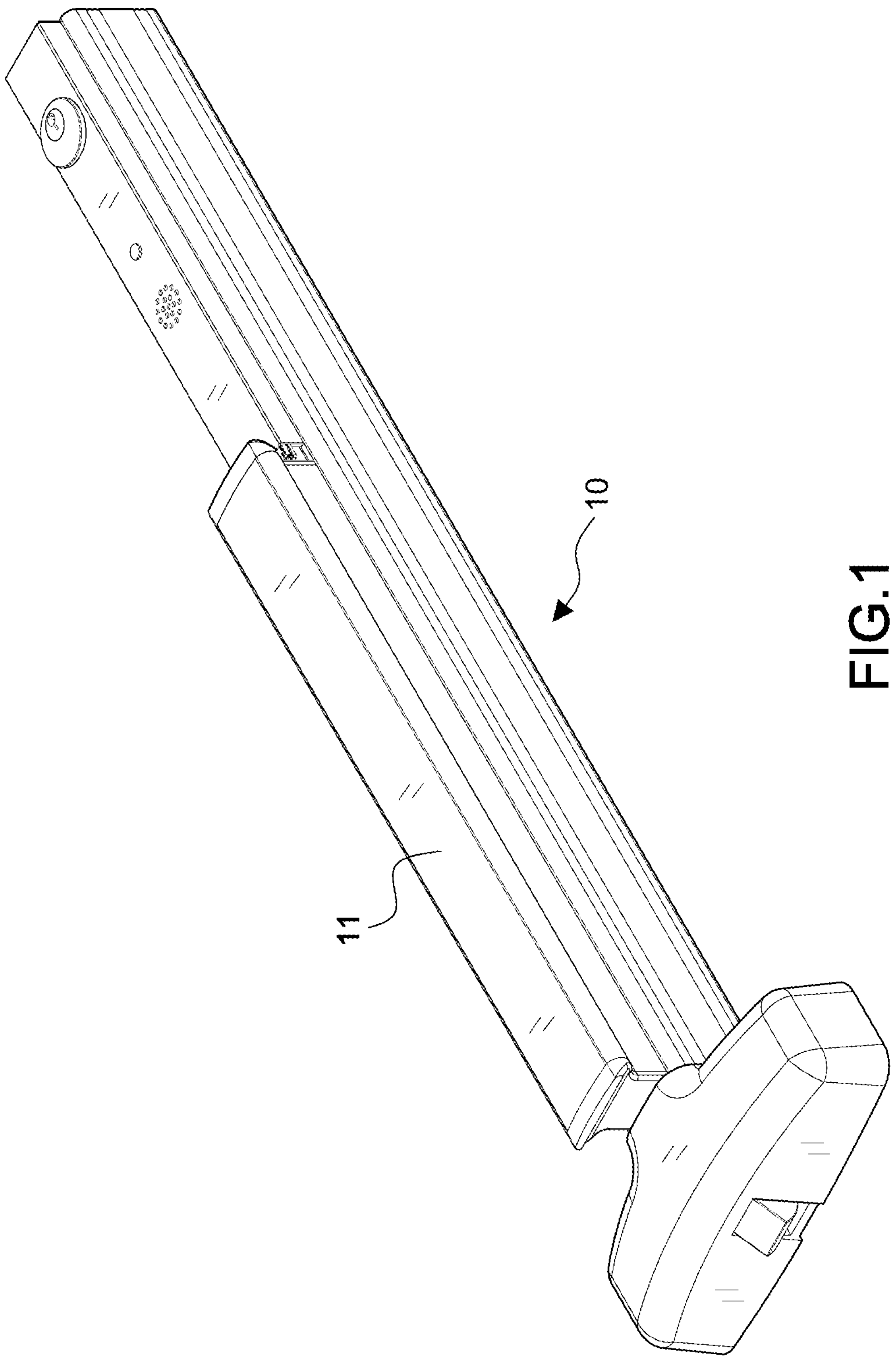
FIG. 1 is a schematic diagram illustrating structure of the push bar latch installed with the present invention.
Figure 2:
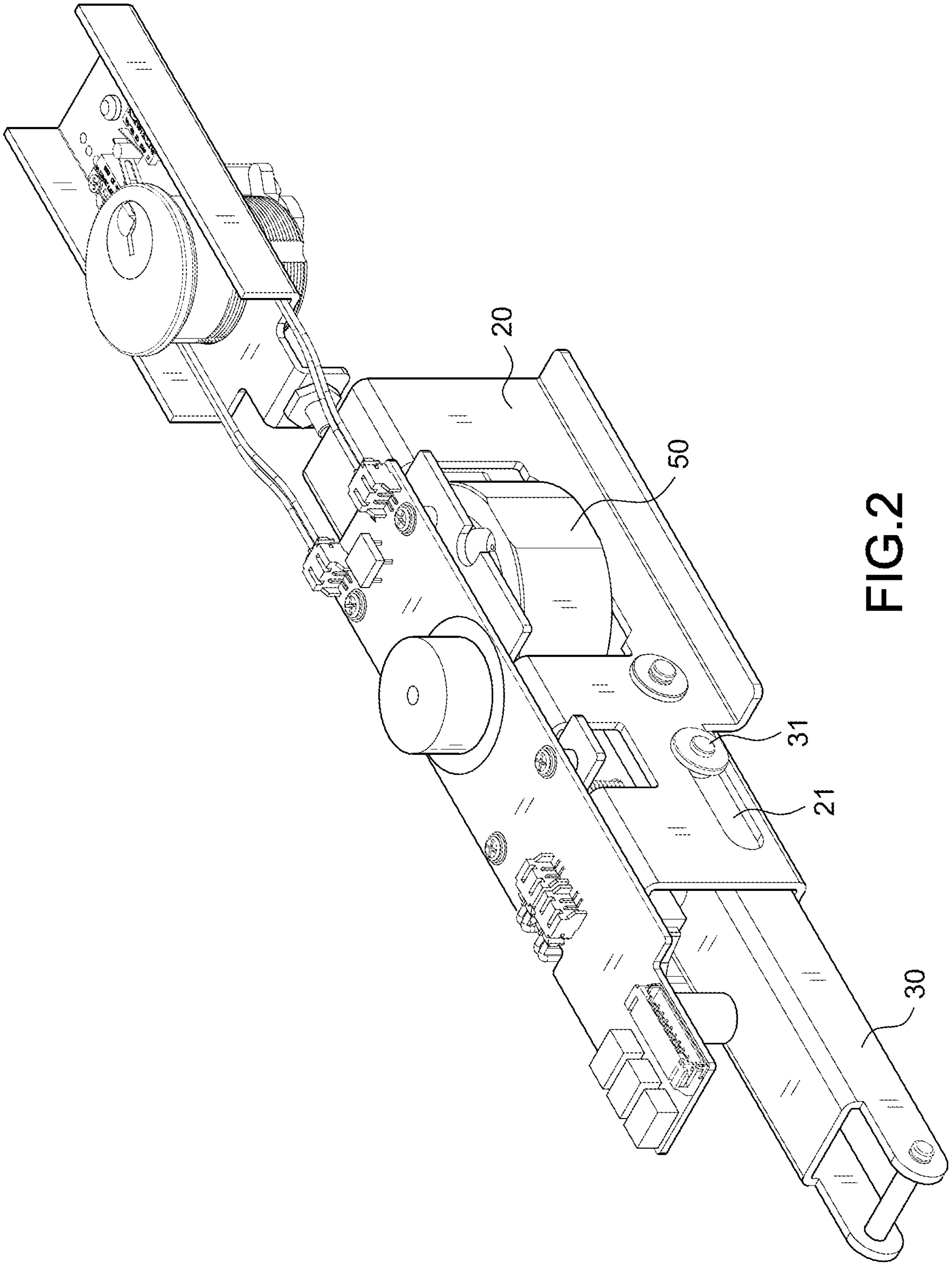
FIG. 2 is a perspective views of the present invention.

Referring to FIGS. 2-5, the present invention, including: a base frame having a sliding slot 21; a control connecting rod 30, the outer end is combined with an unlocking return unit (not showing in drawing, during unlocking, it will shift to the left of the diagram) of the push bar latch 10 and the inner end has a positioning pin 31, the positioning pin 31 is set through the sliding slot 21; a locking hook 40, pivoted on the base frame 20, and the outer end has a hook portion 41 relative to the positioning pin 31; an electromagnet 50, arranged on the base frame 20 relative to the inner end section of the locking hook 40, and used for holding the inner end section of the locking hook 40, so let the hook portion 41 enter a hooking state for the positioning pin 31; and a release element 60 arranges a push rod 61 with a push spring 62 in the electromagnet 50 relative to the locking hook 40, whereby the electromagnet 50 is arranged on the base frame 20 (the release element 60 can directly arranged on the base frame 20), when the electromagnet 50 is powered off, the push spring 62 pushes out the push rod 61 to push the locking hook 40 to release the hook portion 41 from the hooking state of the positioning pin 31, the inner end of the push rod 61 has a limit buckle 63, the limit buckle 63 limits the distance that the push rod 61 is pushed out by the push spring 62, and a reverse push spring 64 is arranged between the locking hook 40 and the base frame 20 relative to the push spring 62; wherein the setting of the reverse push spring 64 is to maintain a proper distance between the inner end section of the locking hook 40 and the electromagnet 50 to ensure that the electromagnet 50 can generate adsorption force on the inner end section of the locking hook 40 when the electromagnet 50 is energized.

Figure 3:
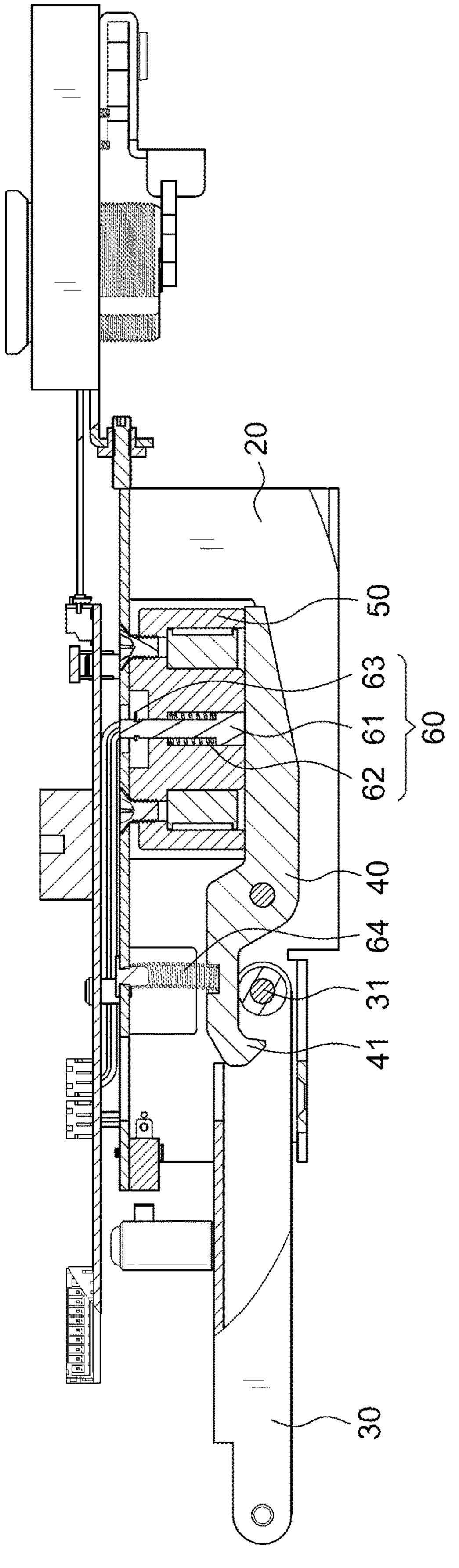
FIG. 3 is a sectional views of the present invention in close mode.
Figure 4:
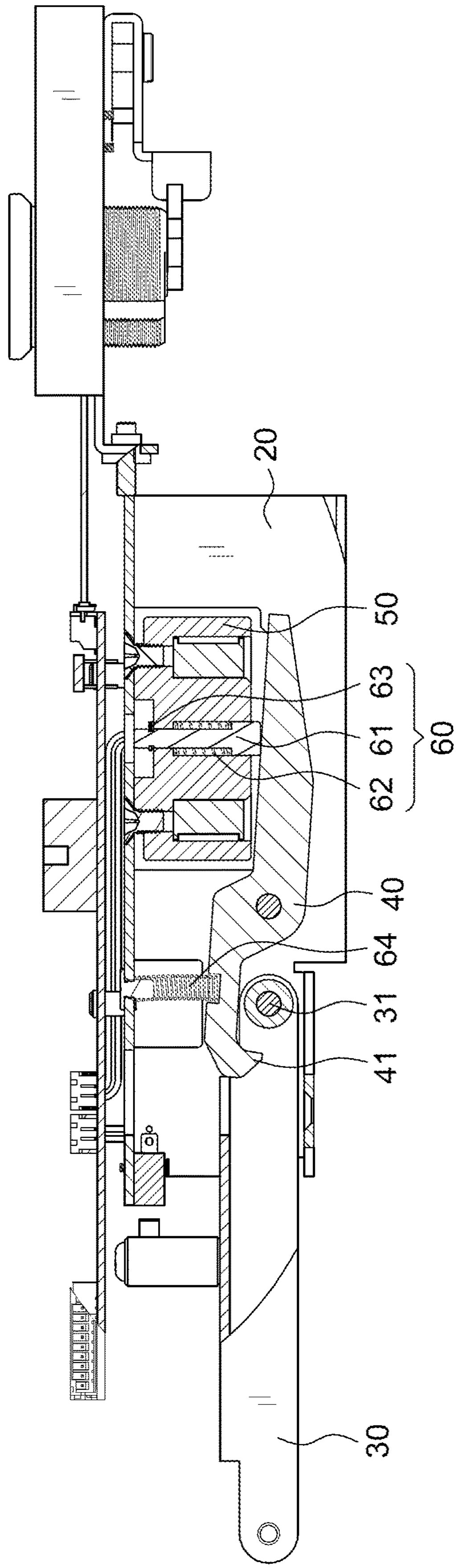
FIG. 4 is a sectional views of the present invention in open mode.
Figure 5:
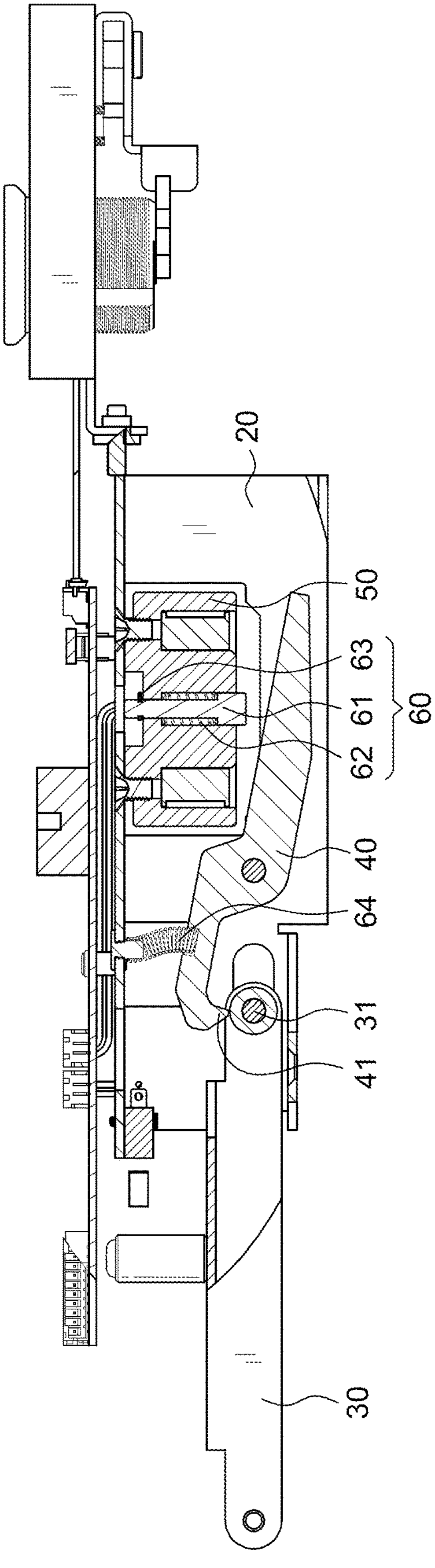
FIG. 5 is a sectional views of the present invention in unlocking mode.

With the feature disclosed above, after the outer end of the control connecting rod 30 of the present invention is combined with the unlocking return unit (not showing in the drawing) of the push bar latch 10, when the electromagnet 50 is energized to attract the inner end of the locking hook 40, the hook portion 41, let the hook portion 41 enter a hooking state for the positioning pin 31 of the control connecting rod 30, as FIG. 3 showing, so that the unlocking return unit (not showing in drawing) is locked (cannot move to the left side of the drawing), and the push bar latch 10 is in close mode, when someone pushes the push rod 11 at this time, the lock cannot be unlocked; in addition, when the electromagnet 50 is powered off, the push spring 62 pushes out the push rod 61 to push the locking hook 40, to release the hook portion 41 from the hooking state of the positioning pin 31, as FIG. 4 showing, and the push bar latch 10 is in open mode that returns to the normal use state of the push bar latch 10, when someone pushes the push rod 11 at this time, the positioning pin 31 can pass through the hook portion 41 to unlock, as FIG. 5 showing; therefore, the push bar latch 10 has the enter control function.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A control device installed in a push bar latch, the control device comprising:

a base frame having a sliding slot;

a control connecting rod having an outer end combined with an unlocking return unit of the push bar latch and an inner end having a positioning pin, the positioning pin passing through the sliding slot;

a locking hook pivotally coupled to the base frame, the locking hook having a hook portion formed on an outer end thereof disposed proximate to the positioning pin and an inner end section on an opposing end of the locking hook;

an electromagnet arranged on the base frame in correspondence with the inner end section of the locking hook, and responsive to the electromagnet being powered on, the inner end section of the locking hook being angularly displaced about the pivotal coupling by magnetic attraction to the electromagnet in a first direction toward the electromagnet, and thereby angularly displaces the hook portion about the pivotal coupling into proximity to the positioning pin to define a hooking state that limits displacement of the positioning pin to thereby lock the push bar latch; and a release element arranged on the base frame in correspondence with the inner end section of the locking hook, and applying a bias force thereto, wherein responsive to the electromagnet being powered off, the release element angularly displaces the inner end section of the locking hook about the pivotal coupling in a second direction away from the electromagnet and thereby angularly displaces the hook portion about the pivotal coupling away from the positioning pin and unlock the push bar latch.

2. The control device installed in a push bar latch as claimed in claim 1, wherein the release element includes a push rod and a push spring biasing the push rod in the second direction, responsive to the electromagnet being powered off, the push spring displaces the push rod and the inner end section of the locking hook therewith in the second direction and thereby displace the hook portion of the locking hook from proximity to the positioning pin.

3. The control device installed in a push bar latch as claimed in claim 2, wherein the electromagnet is annular, and the push rod and the push spring are arranged in the electromagnet.

4. The control device installed in a push bar latch as claimed in claim 3, wherein an inner end of the push rod has a limit buckle coupled thereto, the limit buckle limits a distance that the push rod is displaced by the push spring; and a reverse push spring is arranged between the hook portion of the locking hook and the base frame to apply a bias force thereto and thereby limit displacement of the inner end section of the locking hook in the second direction.

* * * * *